April 2, 1946.  W. C. MEINERDING  2,397,748

VEHICLE LIGHTING SYSTEM

Filed Feb. 11, 1944

INVENTOR.
Wesley C. Meinerding

BY *Lancaster, Allwine and Rommel*
ATTORNEYS.

Patented Apr. 2, 1946

2,397,748

UNITED STATES PATENT OFFICE 2,397,748

VEHICLE LIGHTING SYSTEM

Wesley C. Meinerding, Canton, Ohio

Application February 11, 1944, Serial No. 521,993

3 Claims. (Cl. 240—7.1)

This invention relates to vehicle lighting and more particularly to an anti-glare lighting system for motor vehicles.

An important object of the invention is to provide a lamp, disposed underneath the vehicle chassis, adapted to project light rays longitudinally and laterally of the vehicle, but toward the surface travelled upon by the vehicle.

Another important object is to provide an auxiliary lamp for a headlights-equipped vehicle, so disposed that the eyesight of a person in front of the vehicle is not focused upon the generally blinding headlights, but is directed to the light from the auxiliary lamp, beneath the vehicle. With the headlights' glare less noticed, the operator of a vehicle can better determine the location of an on-coming vehicle equipped with the novel auxiliary lamp.

Still another important object is to provide an auxiliary vehicle lamp, which projects light rays to either side of a vehicle, rearwardly of the front of the vehicle, and beneath the vehicle. Thus, curbing, shoulders and objects at the sides of the road are illuminated and tire changes and the like may be made by this light.

Other objects and advantages will be apparent in the following detailed description of the invention, taken in connection with the accompanying drawing, forming a part of this specification, and in which drawing.

Figure 1:
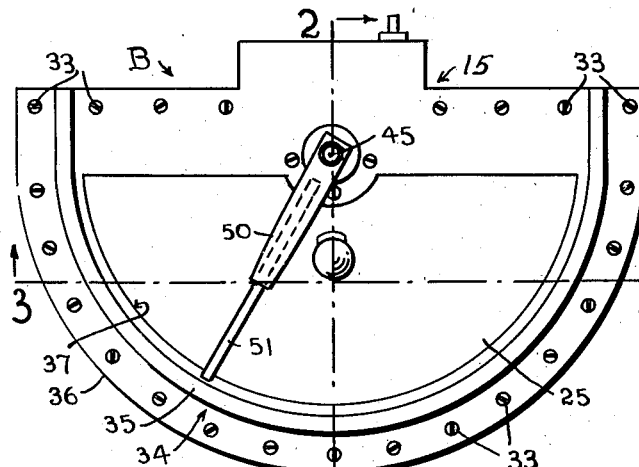
Figure 1 is a bottom plan of the new lamp.

In the drawing wherein, for the purpose of illustration, is shown a preferred embodiment of the invention and wherein similar reference characters designate corresponding parts throughout the several views, the letter A may designate a vehicle; B, the novel lamp; and C, means for attaching the lamp B to the vehicle A.

The vehicle A is shown as a motor truck 10, having a chassis 11, wheels 12, headlights 13, and windshield wipers 14, provided with conventional means (not shown) for operating the latter.

As for the novel lamp B, the same includes a casing or housing 15 having an arcuate front wall 16, rear wall 17, joining the front wall 16 and a substantially flat top or upper wall 18, joining the front and rear walls. There is no bottom wall as the casing is open at its bottom. The rear wall 17 extends toward the front wall 16 intermediate its ends, defining a recess 20 accommodating a housing for a wiper mechanism to be subsequently described. Extending outwardly from the front wall 16, at its bottom edge is a flange 21 provided with a plurality of spaced-apart screw-threaded openings 22.

Figure 2:
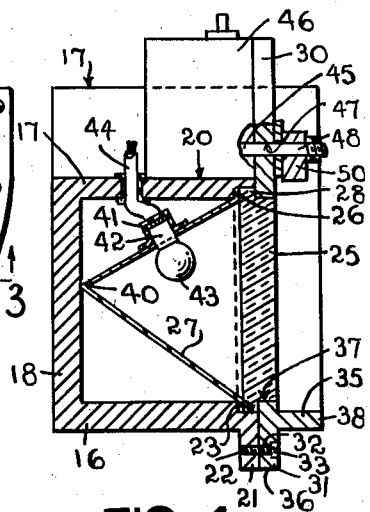
Figure 2 is a transverse vertical section upon substantially the line 2—2 of Figure 1.
Figure 3:
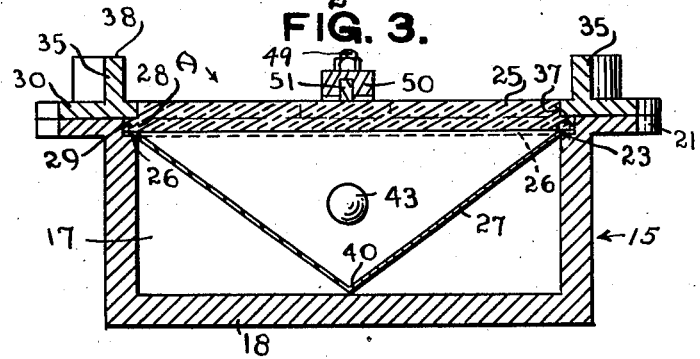
Figure 3 is a longitudinal vertical section upon substantially the line 3—3 of Figure 1.

It will be noted in Figs. 2 and 3 that a recess 23 is provided in the flange 21 at its inner end for accommodating both a transparency 25 and the flange 26 of a reflector 27.

The transparency 25 may be a sheet of glass, plastic or the like. As shown in Figs. 2 and 3, it is stepped as at 28, so that a shoulder 29 is provided and this fits into the recess 23, with the body of the transparency extending from the shoulder 29 being of less area than the remainder of the same.

Means for retaining the transparency in place comprises a rim 30 arcuate in its front portion 31 and conforming there to the flange 21. This rim extends over the flange 21 and the shoulder 29 of the transparency 25 and has screw-threaded openings 32 aligning with the openings 22. Suitable screws 33 may be employed to detachably secure the rim 30 to the flange 21. This rim extends, also, over the wiper mechanism housing. As will be seen in Fig. 2, the outer surface of the transparency 25 and outer surface of the rim 30 are in the same horizontal plane.

Depending from the rim 30 is a shield or guard 34 which comprises a substantially vertical arcuate wall 35 extending from a position intermediate the arcuate outer edge 36 and arcuate inner edge 37 of the rim 30. The wall 35 may have a substantially flat lower face 38 and this wall provides means to shield the transparency from splash, as it has a considerable depth (and is not in the nature of a bead or narrow flange). It also protects the wiper blade to be subsequently described.

Housed in the casing 15 and above the transparency 25 is a substantially conical reflector 27, having an outwardly-extending flange 26 at its lower edge, with this flange 26 in the recess 23 and next above the transparency 25. The apex 40 of the reflector preferably abuts the top wall 18, and is thus retained against excessive vibration.

Carried by the reflector 27 is an electric lamp socket 41 accommodating the base 42 of a conventional electric lamp 43. This socket 41 is supported by the rearmost portion of the reflector wall, so that the lamp faces toward the front of the lamp casing 15. Because of the arcuate inner edge 37 and arcuate wall 35, the light rays define an arcuate illuminated area to the front and sides of a vehicle, when the novel lamp is properly positioned. Of course there is also an illuminated area to the rear of the vehicle. Any suitable means, as the two wire conductor 44, may be employed to operatively connect the lamp 43 with a conventional source of electric energy.

Associated with the casing 15 is a wiper, including a conventional wiper mechanism 45 housed within a suitable housing 46 at the rear of the casing 15 and within the recess 20. The rim 30 may provide a bottom wall for the housing 46 and have an opening 47 accommodating the conventional spindle 48 which normally rotates substantially 160° in each direction and to the outwardly-projecting end 49 of which is suitably secured a wiper arm 50 having a swab 51 adapted to wipe over the outer face of the transparency 25.

Figure 4:
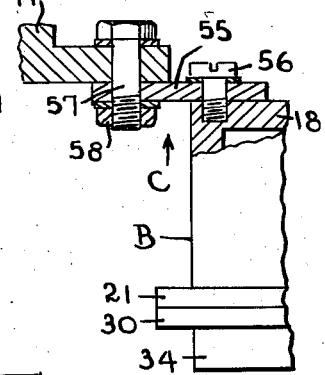
Figure 4 is a fragmentary section and elevation of the novel lamp, showing one method of attaching it to a vehicle chassis.

As an example, the means C illustrated in Fig. 4 may be employed to attach or secure the lamp B to a vehicle A. This may include a short bar 55 having one end secured, as by a screw 56 to any suitable portion (as the top wall 18 of the casing 15), and its other end secured, as by a bolt 57 and nut 58 to any suitable portion of the chassis 11 of the truck 10. In the example shown, one of the several pairs of flanges extending over the lower portion of the chassis is employed.

Figure 5:
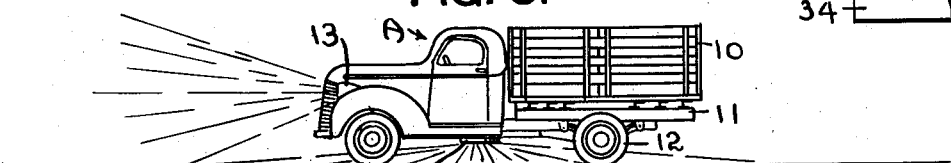
Figure 5 is a side elevation of a motor vehicle equipped with the novel lamp.
Figure 6:
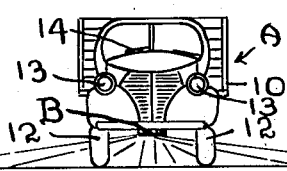
Figure 6 is a front elevation of the same vehicle.

Preferably, the novel lamp B is positioned intermediate the front and rear ends of the vehicle, in a position so that the wheels 12 will not seriously interfere with the rays of light, and disposed along the longitudinal medial line of the vehicle as shown in Figs. 5 and 6. So positioned, an arcuate lighted area will extend over the road or other surface, outwardly beyond the front and sides of the vehicle and there will be an illuminated area of surface under and to the rear of the vehicle, as is apparent in Figs. 5 and 6. Even with the main vehicle headlights 13 lighted, the eyes of an approaching person will focus upon the rays from the lamp C. Since the lamp C is positioned so low that the electric lamp 43 will not be seen, and its rays are directed toward the road surface, there will be no blinding glare from the lamp B.

The wiper mechanism 45 may be operatively connected, in any conventional or approved way with the mechanism operating the windshield wipers 14.

Splash from the wheels 12 is not apt to reach the transparency 25 due to the depending guard 34 but, if it does, the wiper swab 51 will wipe it away and upon the rearward portion of the rim 30 (since the lowermost surfaces of the rim 30 and transparency 25 are in the same horizontal plane), where forward movement of the vehicle will tend to cause the accumulation of splash material to move rearwardly and finally pass over the rear end of the lamp housing, since there is no depending guard wall there.

Various changes may be made to the form of the invention herein shown and described without departing from the spirit of the invention or scope of the claims.

What is claimed is:

1. In an auxiliary lamp for a motor vehicle, a housing having an arcuate front wall, a rear wall joining said front wall and a downwardly-directed opening, a substantially horizontally-disposed transparency in said opening, means securing said transparency in said opening comprising a rim over the edge portions thereof and screws extending through said rim and into said housing, an arcuate depending wall carried by said rim, inwardly of the outer edge thereof and adjacent said transparency, wiper means for said transparency including a wiper arm disposed inwardly of the horizontal plane of the lowermost edge of said depending arcuate wall and a pivot for said arm disposed adjacent said rear wall, a conical reflector within said housing and an electric lamp carried by said reflector and facing toward said arcuate walls.

2. In an auxiliary lamp for a motor vehicle, a housing having an arcuate front wall, a rear wall joining said front wall and a downwardly-directed opening, a substantially horizontally-disposed transparency in said opening, means securing said transparency in said opening including a rim over the edge portions thereof, an arcuate depending wall carried by said rim, inwardly of the outer edge thereof and adjacent said transparency, wiper means for said transparency, including a wiper arm disposed inwardly of the horizontal plane of the lowermost edge of said depending arcuate wall and a pivot for said arm disposed adjacent said rear wall, a reflector within said housing and an electric lamp carried by said reflector and facing toward said arcuate walls.

3. In an auxiliary lamp casing for a vehicle, a housing having an arcuate front wall, a rear wall joining said front wall and a downwardly-directed opening, a substantially horizontally-disposed transparency in said opening, means securing said transparency in said opening, including a rim over the edge portions thereof, a depending wall carried by said rim, spaced from the outer edge thereof and from said transparency, wiper means for said transparency, including a wiper arm and a pivot therefor, said pivot extending through said rim and said wiper arm being disposed inwardly of the horizontal plane of the lowermost edge of said depending wall, a reflector and an electric lamp within said housing with said electric lamp facing toward said arcuate walls.

WESLEY C. MEINERDING.